United States Patent [19]
Maurino et al.

[11] 3,980,269
[45] Sept. 14, 1976

[54] MOLDING APPARATUS INCLUDING A ONE-PIECE FLEXIBLE MOLD HAVING MALE AND FEMALE FORMING MEMBERS

[75] Inventors: William J. Maurino; Raymond M. Putzer, both of Racine, Wis.

[73] Assignee: Precision Flexmold, Inc., Racine, Wis.

[22] Filed: Jan. 20, 1975

[21] Appl. No.: 542,176

[52] U.S. Cl. ............................... 249/139; 249/127; 249/179; 264/313; 425/DIG. 44; 425/440
[51] Int. Cl.² ...................... B29C 1/16; B29C 1/12; B28B 7/10; B28B 7/06
[58] Field of Search ........ 249/66, 127, 134, DIG. 1, 249/120, 179, 139; 425/DIG. 44, 440; 264/313, 316

[56] References Cited
UNITED STATES PATENTS

| | | |
|---|---|---|
| 854,394 | 5/1907 | Allender ........................ 249/DIG. 1 |
| 2,129,240 | 9/1938 | Sanborn ......................... 264/313 X |
| 2,660,776 | 12/1953 | Miller ............................. 425/DIG. 44 |
| 3,196,777 | 7/1965 | Luker .............................. 249/134 |
| 3,776,683 | 12/1973 | Putzer ............................ 425/DIG. 44 |
| 3,815,863 | 6/1974 | Andeweg ........................ 425/DIG. 44 |

Primary Examiner—Francis S. Husar
Assistant Examiner—John S. Brown
Attorney, Agent, or Firm—James E. Nilles

[57] ABSTRACT

Molding apparatus for molding hollow articles without a seam or parting line even though the articles may have backdraft or undercut portions on both the inside and outside surfaces. The apparatus includes a generally one-piece flexible mold having a generally thick self-supporting wall construction which is deformable by the application of a fluid pressure differential. The mold includes a generally hollow outer portion and a generally hollow inner portion integrally formed with and extending upwardly from the bottom wall of the outer portion, said mold portions defining an upwardly opening generally annular cavity into which hardenable material is placed. The apparatus also includes a vacuum pot being of such size so as to receive said mold therein and forming a sealed generally annular chamber between the pot and the outer mold portion and means for drawing a vacuum in said chamber whereby the outer mold portion distends and expands into the vacuum chamber and the inner mold portion collapses to permit its withdrawal from the molded article. The apparatus further includes an upwardly extending mandrel fixed to the bottom wall of the pot for causing axial stretching of the inner mold portion when the vacuum is applied to cause it to contract in a uniform radial manner around the mandrel.

1 Claim, 4 Drawing Figures 3,980,269

MOLDING APPARATUS INCLUDING A ONE-PIECE FLEXIBLE MOLD HAVING MALE AND FEMALE FORMING MEMBERS

BACKGROUND OF THE INVENTION

This invention pertains to molding devices for molding seamless hollow articles having backdraft or undercut portions on both interior and exterior surfaces. The invention includes a generally hollow one-piece distensible and flexible mold including male and female portions which define a cavity corresponding to the configuration of the molded article. This invention further includes utilizing a vacuum to draw the flexible mold away from the molded article to thereby permit the article to be removed notwithstanding undercut portions formed in the article.

Molding devices generally employing a flexible mold and vacuum means for pulling the flexible mold away from the molded article are shown in the U.S. Pat. No. 3,776,683 issued Dec. 4, 1973 to Putzer et al. The apparatus disclosed therein comprises a distensible flexible mold which may be placed within a vacuum pot such that an annular chamber is formed between the vacuum pot and the mold from which vacuum is drawn to thereby cause the flexible mold to distend, and expand into the chamber and away from the formed article thereby permitting the article to be removed from the mold.

SUMMARY OF THE INVENTION

The present invention provides apparatus for molding seamless articles and includes a generally hollow one-piece, distensible, flexible mold capable of forming articles having backdraft or undercut portions on both the inside and outside surfaces. One aspect of the invention includes a flexible male-female mold having a generally hollow outer portion and a generally hollow inner portion projecting upwardly from the bottom wall of the outer mold portion, the two mold portions defining a generally annular mold cavity open at the top. The outer mold portion has side walls of sufficient thickness to be self-supporting and capable of supporting the weight of the molding material. The mold is suspended by a radially extending flange at its top in a vacuum pot to form a sealed vacuum chamber between the pot and the mold. When vacuum is applied to the chamber, the mold is pulled downwardly into the vacuum pot, the outer flexible mold portion is caused to be expanded radially outwardly away from the molded article, and the inner mold portion is caused to be pulled radially inwardly away from the molded article. The vacuum pot is supplied with an upwardly extending mandrel which fits within the downwardly opening cylindrical cavity of the inner mold portion such that as the mold moves downwardly into the pot the mandrel contacts the upper wall of the inner mold portion causing it to stretch axially at the same time it is contracting radially due to the vacuum. This combination of stretching forces causes the inner mold portion to collapse radially rather than to flatten out which would prevent withdrawing of the inner mold from the finished article.

Another aspect of the invention is that by constructing the male and female mold members integrally the dimensions of the walls of the molded article can be consistently determined and close tolerances maintained.

The arrangement of the mold members of the present invention is such that the mold cavity therebetween opens upwardly, facilitating easy filling and packing of the mold regardless of the material used.

The arrangement of the mold members facilitates the use of radially extending mating projections from the inner and outer mold portions for defining apertures or passages through the walls of the hollow molded article.

With the mold apparatus set out herein, seamless hollow articles having interior and exterior undercuts may be accurately produced in a very rapid manner and with considerable economy.

DESCRIPTION OF THE PREFERRED EMBODIMENT

Generally, the present invention is concerned with production of hollow articles, particularly those having considerable backdraft or undercut portions and which articles are formed of hardenable material in flexible molds comprising a male and female portion. Various types of hardenable material may be molded with the present invention, and include but are not limited to plaster, cement, resins, paraffin, polyesters, epoxies, urethane foams, metals, or other materials.

The flexible material used to comprise the mold body may consist of any flexible mold material having elastomeric properties, the specific type of mold material used generally depending on the compatibility of the mold material with the materials molded. Materials having the desirable elastomeric properties include, for example, but not by way of limitation, polyvinyl chloride "Korogel" produced by B. F. Goodrich of Akron, Ohio; polysulphide cold molding compounds sold by Perma Flex of Columbus, Ohio; the silastic RTV silicone rubber produced by Dow Corning and General Electric, and urethane elastomers.

Figure 1:
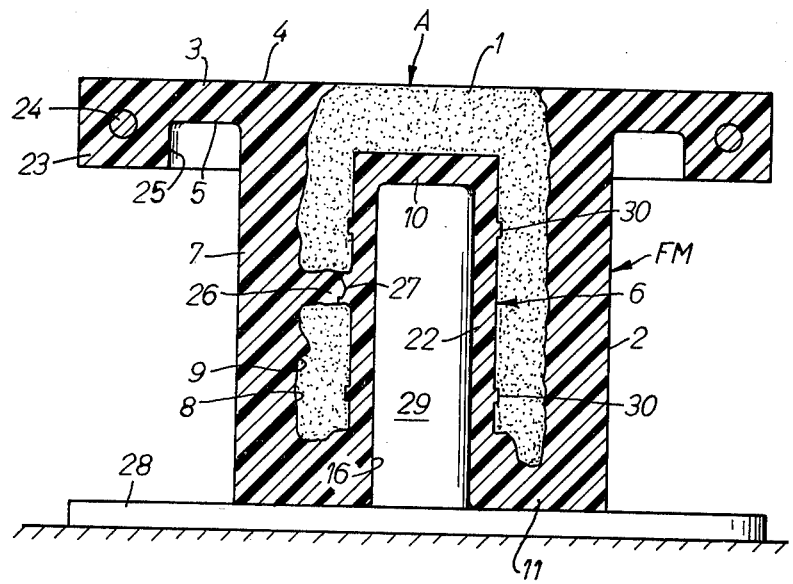
FIG. 1 is a vertical, cross-sectional view of the mold in accordance with the present invention containing molding material.
Figure 2:
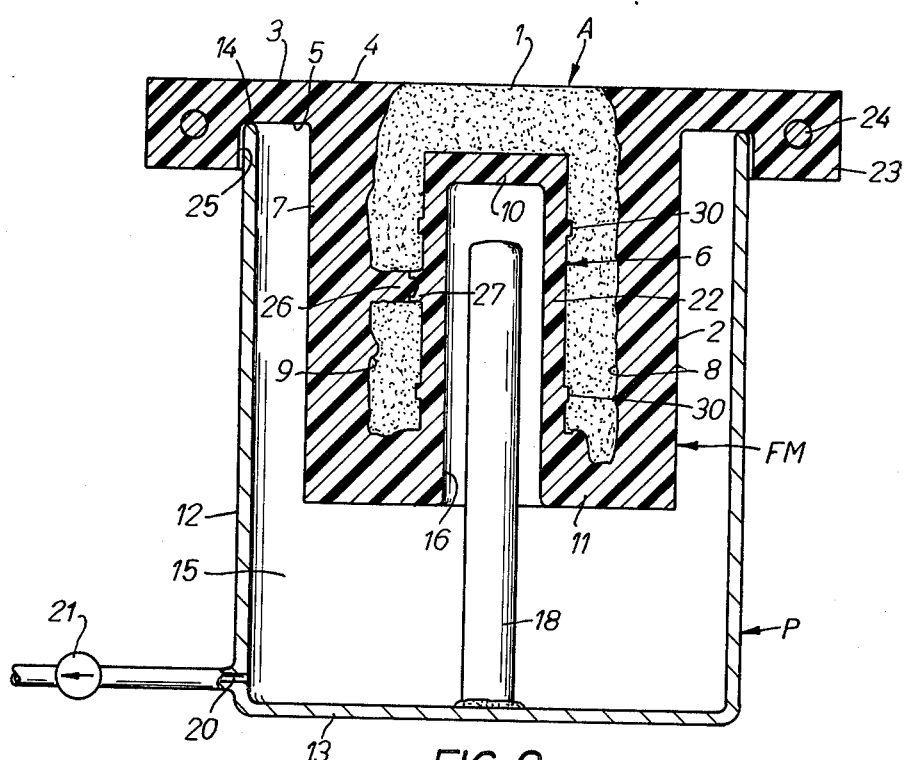
FIG. 2 is a vertical cross-sectional view of the mold in accordance with the present invention suspended in the vacuum pot.
Figure 3:
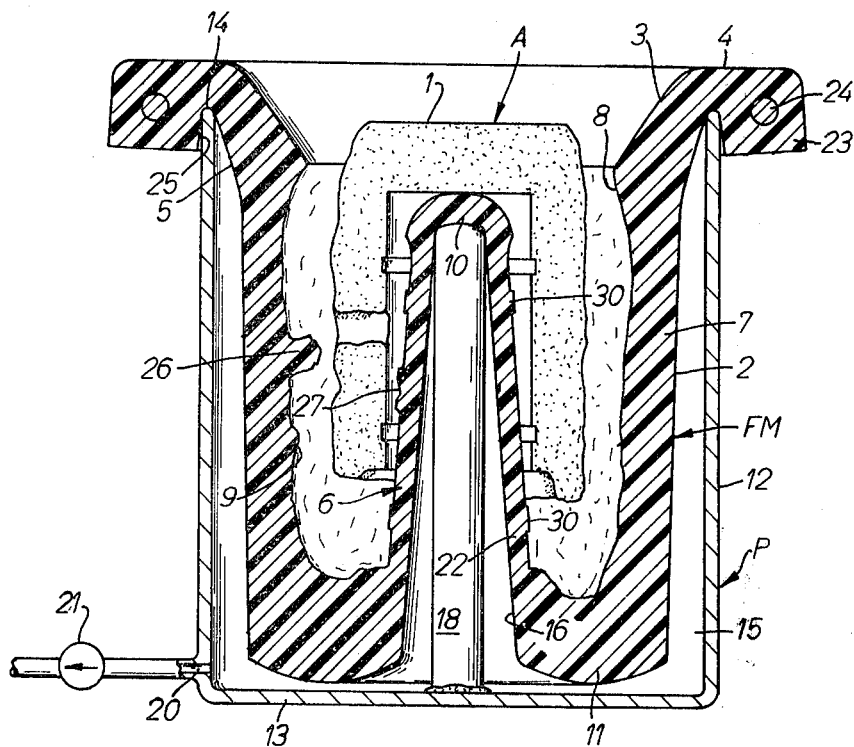
FIG. 3 is a view similar to FIG. 2, but with vacuum applied to the vacuum chamber.
Figure 4:
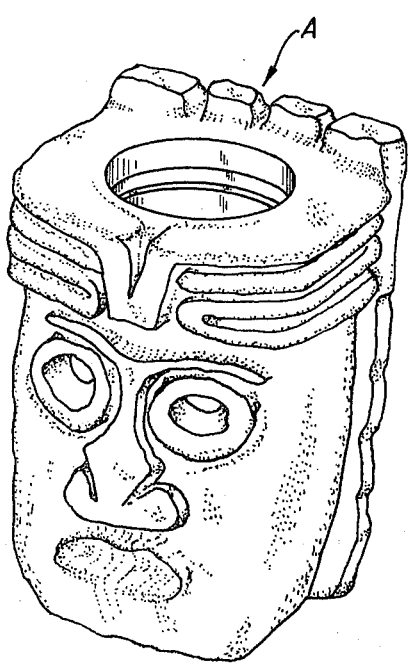
FIG. 4 shows the molded article.

The invention has been shown in FIGS. 1 to 3 as including a generally hollow, one-piece distensible flexible mold FM. This mold has a main, generally cylindrical portion 2, adjacent the upper end of which is an integrally formed and relatively thick and self-supporting, radially extending annular flange 3. The mold has a generally flat, smooth and unobstructed upper surface 4 and the flange has a generally flat lower surface 5. Side wall 7 of the mold is of a width which varies throughout its height and defines a cavity 8 in the mold which has a plurality of irregular back drafts or undercuts 9. The thickness of the wall 7 is such that it is self-supporting and can rest on a flat surface to support the weight of the molding material 1 which fills the mold cavity without distortion of the mold. The mold also has a generally centrally located inner male mold portion 6 integrally formed with the bottom wall 11 of the outer mold portion. The male mold portion 6 has upper end wall 10 and side walls 22 which define a downwardly opening cylindrical cavity 16. As shown in FIG. 1, the side walls 22 may be substantially thinner than the side walls 7 of the outer portion. The flexible mold FM, as shown in FIG. 2, is inserted in a vacuum pot P, having side walls 12, and a bottom wall 13. The side walls have an upper surface 14 on which the mold and, more particularly, the lower surface 5 of the flange 3 rests in sealing engagement. The mold and the pot thus form a vacuum chamber 15. The vacuum is formed by means of passageway 20 leading into chamber 15 from a conventional vacuum pump 21.

A mandrel 18 is centrally located in the bottom of the pot and fixed thereto. The mandrel extends upwardly into the cylindrical cavity 16 in the inner male mold portion and forms an annular cavity therewith.

The flange 3 includes a downwardly extending annular projection 23 around its periphery for positioning the mold and flange on the vacuum pot. The periphery of the flange also has imbedded therein a rigid annular ringlike member 24 designed to prevent distortion of the shape or diameter of the periphery of the flange. It should be noted that, as shown in FIG. 2, the inside surface 25 of the downwardly extending projection is slightly larger than the outside diameter of the vacuum pot, thus allowing the flange to fit freely over the pot, and avoiding the necessity of stretching the periphery of the flange or the downward projection when placing the mold and flange in the pot. This results in a substantial saving of time during the assembly process.

The molds shown in FIGS. 1 and 2 show the outer mold portion having an inwardly extending projection 26 in separable abutting engagement with an outwardly extending projection 27 from the inner mold member. The purpose of the projections is to provide the molded article A with apertures. The projections are shown as having respective male and female aligning means to facilitate accurate alignment of the projections during the molding step but also facilitating relatively easy separation of the projections when the mold is pulled away from the finished article, as shown in FIG. 3.

The first step of the molding operation using the apparatus of this invention is shown in FIG. 1. The mold FM is centrally positioned upon a plate 28 such that a cylindrical packing mandrel 29 extending upwardly from plate 28 is securely positioned within the downwardly opening cavity defined by the inner mold portion 6. Hardenable molding material 1 of a type previously described is then securely packed into the mold cavity 8. The purposes of packing mandrel 29 is to support the thinner walled inner mold portion during the packing process. The outer mold portion need not be supported similarly because its wall thickness is sufficient to support the molding material without distortion.

The filled mold is then removed from the packing mandrel 29 and plate 28 and placed within vacuum pot P, as shown in FIG. 2, the lower surface 5 of flange 3 resting on the upper edge of the pot 14 and providing a fluid tight seal therewith and the inside surface 25 of the downwardly extending projection of the flange providing means for centering the mold within the pot. The mold is positioned in the pot such that the mandrel 18 is positioned generally within the downwardly opening cavity defined by the inner mold thereby defining an annular cavity.

Vacuum is then applied by pump 21 to cause the outer mold to distort radially outwardly away from the molded article and to cause the inner mold portion to collapse radially inwardly, as shown in FIG. 3, so that the article can be removed from the mold notwithstanding the undercut portions formed in the article. When vacuum is created in the chamber 15, the ambient air pressure on the upper surface of the mold forces the mold downwardly and then stretches the side walls of the outer mold outwardly, as shown in FIG. 3. As the mold is forced downwardly the inside surface of the upper wall of the inner mold portion abuts the end of mandrel 18 and is stretched down around it as the mold moves downwardly. Two forces thus act on the inner mold portion to cause it to collapse evenly in the radial direction. The vacuum inside of the inner portion causes the walls 22 to move inwardly and the mandrel 18 causes the collapse of the walls to be radial. If the mandrel is not used or if the mandrel is too small in diameter the walls tend to collapse such that the inner mold portion would have an oblong or elliptical cross section and the two outermost surfaces of the mold portion would remain in contact with the molded article possibly preventing its removal from the mold or damaging the inner surface of the article during removal. The mandrel 18 must not be so large in diameter, however, as to prevent the inner mold portion from collapsing sufficiently to withdraw the projections 27 and 30 from the molded article.

RESUME

The apparatus provided by the present invention is capable of producing hollow molded articles having undercut portions on both inside and outside surfaces and without seams. The invention further provides means for consistently maintaining the dimensional thickness of the molded article since the male and female mold elements are integrally connected, and also allows for easy filling of the mold cavity thus facilitating rapid, economical production of the molded article.

We Claim:

1. Apparatus for molding a generally hollow and seamless article comprising a one-piece distensible flexible mold having a generally hollow outer portion and a generally hollow inner portion, said outer mold portion having a bottom wall, said inner mold portion being integrally formed with and extending upwardly from said bottom wall and comprising a generally cylindrical body having an upper end wall and defining a downwardly opening generally cylindrical cavity, said mold portions defining an upwardly opening generally annular cavity into which hardenable material can be placed and which is of the configuration of the article to be molded, said outer mold portion being of such wall thickness that it is self-supporting and supports the weight of the material poured therein without distortion; a vacuum pot being of such size so as to receive said mold therein, said outer mold and pot forming a sealed generally annular chamber therebetween, an upwardly extending rigid mandrel projecting from and fixed to the bottom of the pot and into the hollow downwardly opening cavity of said inner mold portion, the rigid mandrel and inner mold portion being spaced apart and defining an annular space into which said mold can collapse, and means for drawing a vacuum in said chamber whereby said outer mold portion distends and expands into said chamber and said inner mold portion collapses to permit its withdrawal from said article when the latter has hardened.

* * * * *